Figure 1:
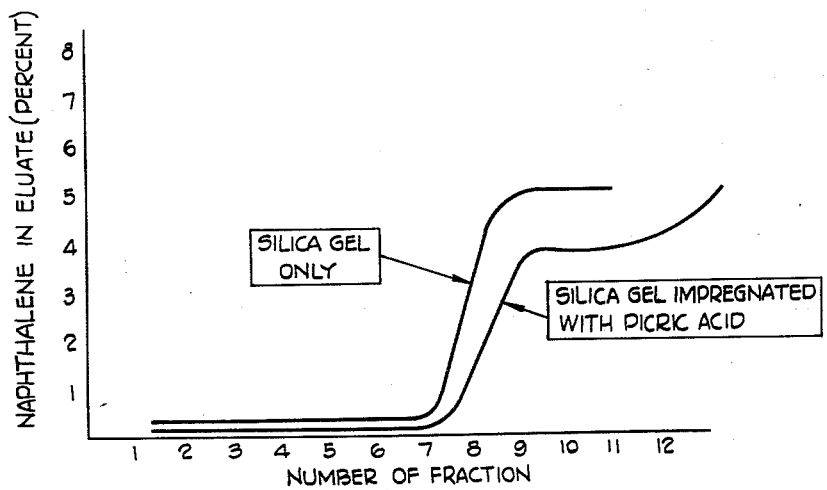

INVENTOR.
ROBERT W. FOREMAN

United States Patent Office 2,941,018
Patented June 14, 1960

2,941,018

PERCOLATION PROCESS FOR THE RECOVERY OF NAPHTHALENE USING SILICA GEL IMPREGNATED WITH PICRIC ACID

Robert W. Foreman, Cleveland, Ohio, assignor to The Standard Oil Company, Cleveland, Ohio, a corporation of Ohio Filed June 22, 1956, Ser. No. 593,264

1 Claim. (Cl. 260—674)

This invention, which has to do with a process for separating conjugated polynuclear aromatic compounds such as naphthalene from hydrocarbon mixtures containing them, is an improvement on the process of Mavity Patent 2,395,491.

In the Mavity patent are described processes for separating polynuclear from mononuclear aromatic compounds by contacting mixtures containing alkyl-substituted benzenes and polynuclear aromatic hydrocarbons of the fused ring type with solid adsorbents under conditions such that the polynuclear aromatic hydrocarbons are selectively adsorbed. The polynuclear aromatic hydrocarbons are recovered from the adsorbent. Silica gel is the preferred adsorbent; however, various other adsorbents are suggested; e.g., activated alumina, bauxite, permutites, adsorbent clays and earths, and sundry forms of activated charcoal chars.

In general, a process of this sort employs temperature and pressure conditions such that the hydrocarbons are in the liquid phase during the separation step. The adsorbent is in the form of a fixedly supported bed. This type of bed is particularly satisfactory if silica gel is employed in it as the adsorbent. When silica gel is used, the process can generally be carried out under atmospheric temperatures and pressures, although superatmospheric pressures and temperatures above ordinary room temperatures can be used if desired.

It is usually necessary to treat the adsorbent to effect the removal of the adsorbed polynuclear aromatic compounds. The following procedures are mentioned by way of example:

(a) Heating the adsorbent to vaporize the adsorbed hydrocarbon compounds and thereafter condensing them.

(b) Treating the adsorbent at elevated temperatures with steam or vapors from low boiling hydrocarbons to effect desorption or displacement of the adsorbed hydrocarbon compounds.

(c) Treating the adsorbent with liquid; e.g., water or a liquid hydrocarbon, at a temperature sufficiently high to effect desorption or displacement of the adsorbed hydrocarbon compounds.

The present invention has for its principal object to enhance the over-all efficiency of these and like processes. According to the present invention, this is done by depositing on the adsorbent a complexing agent of a kind that has an affinity for fused polynuclear aromatic compounds. Several types of complexing agents answering the requirements of such a system are known. At the present time, picric acid, which may be considered as representing one of these types, constitutes a preferred example of a suitable complexing agent. The invention will be better understood from the following discussion of the factors that enter into and affect the improved process.

*The hydrocarbon stock.*—The hydrocarbon stocks that can be treated in accordance with the invention may be any that contain an appreciable amount of fused polycyclic aromatic compounds. Examples are the naphthalenes, which, as used herein, include naphthalene ($C_{10}H_8$) and its homologues and its substituted compounds such as methyl naphthalene, naphthols, etc., phenanthrene and anthracene and their substituted compounds, such as ethyl-phenanthrene and anthraquinone. The hydrocarbon with which the fused polycyclics are found mixed in the stock may boil in the same range or below or above the fused polycyclics, and may, for example, be aliphatic hydrocarbons, heterocyclics, naphthenes and monocyclic aromatic compounds. These compounds are not separated by the process to any appreciable extent. Any stock may be used as long as it is liquid under the treating conditions.

The amount of the fused polycyclic aromatic compounds in the stock to be treated may vary from a fraction of 1% to a major portion. The larger the amount, the greater is the efficiency of the process. Usually the stock has from 0.05% to 50%, preferably 1% to 15%, of the fused polycyclic aromatic compounds. Examples of stocks and the amount of fused polycyclics therein are as follows:

| | Percent |
|---|---|
| Catalytic distillate | 0.5 to 5.0 |
| Thermal reformate | 2.0 to 8.0 |
| Decoker gas oil | 0.1 to 5.0 |
| Coker gas oil | 0.1 to 5.0 |

Included are fractions of these wherein the desired polycyclics have been concentrated by distillation.

*The complexing agent.*—A number of compounds are useful as complexors and the materials which form complexes with fused polycyclic aromatic compounds are known or can be ascertained from the literature. These compounds are selective complexors for naphthalene even in the presence of large amounts of toluene. Most, if not all, of these materials have a high boiling point which is above the boiling point of the fused polycyclic aromatic compounds and the complexes formed therewith. This permits decomposition of the complexes and the recovery of the compound without adversely affecting the complexor.

These complexors fall into several types. One is the anhydride type such as phthalic anhydride, tetrachlorophthalic anhydride and mellitic anhydride. Another is the quinone type, such as chloranil and quinone. Still another type includes the polynitro aromatic compounds, especially monocyclic, such as picric acid, trinitrofluorenone, picramic acid, dinitrochlorobenzene, dinitrophenol, dinitrosalicylic acid, trinitrotoluene, etc. The latter type is preferred. Picric acid has been studied the most extensively and is believed to be the most suitable.

*Deposition of the complexing agent.*—In preparing the adsorbent bed, any of the various adsorbents mentioned above may be used, especially if it is porous, foraminous or particulate in form. Preferred for the purposes of the invention is granular silica gel of 10 to 20 mesh. The complexor, particularly if it also is in finely divided form, may be mixed with the adsorbent in any suitable way, as by means of a muller, blender, mixing cone, tumbling drum or the like. At minimum, the weight of complexor should be 0.1% or more of the weight of the adsorbent; at maximum, it can comprise all but a small part of the weight of the bed.

If the adsorbent is not in finely divided condition, the complexor may, if desired, be dissolved to form a solution in a suitable solvent such as water, methyl alcohol, ethyl alcohol, acetone, the various glycols, particularly polyethylene glycols. After wetting the adsorbent with the solution, the solvent may be evaporated by passing a current of heated air through the bed. The bed is then ready for use.

*Recovery of polynuclear aromatic compounds.*—If desired, the complex may be broken down in situ, as by passing steam through the bed; under some circumstances (excluding those in which the risk of explosion is a factor) it may be broken down by simply heating the bed. In the latter case, polynuclear aromatic compounds such as naphthalene can be vaporized, condensed and recovered in suitable apparatus. On the other hand, the complex may, if preferred, be removed by bringing a suitable solvent into contact with it, withdrawing it from the bed with the solvent, and treating the solution in such manner as to break down the complex. Often the complex is sufficiently soluble in water or water-miscible solvents such as methyl alcohol, ethyl alcohol, diethylene glycol, triethylene glycol or the like to permit of their use, in which case steam distillation may be employed to accomplish the separation of the polynuclear aromatic compounds.

The invention can be readily understood with the aid of the graphs in the accompanying drawings, which summarize the results obtained upon elution of a hydrocarbon test mixture through two types of beds, one with and one without a complexing agent. Figure 1 shows the percentages of naphthalene and Figure 2 the percentages of mesitylene in the eluate at various stages. In each case the ordinates correspond to the percentages; the abscissae, to the fractions. In the experiments summarized in these graphs, elution was substantially complete by the time fraction No. 13 had been collected.

In these runs, a hydrocarbon mixture consisting of 80% iso-octane, 15% mesitylene and 5% naphthalene was admitted to and allowed to percolate slowly at room temperature through a mass of granular silica gel impregnated with picric acid. A similar mixture was admitted to and allowed to percolate through a mass silica gel without picric acid. In both cases, the silica gel was in the form of a column in suitable supporting means. From Figure 1 it will be observed that where silica gel alone was used, naphthalene appeared in small amounts in six of the first seven fractions. Where the column consisted of silica gel impregnated with picric acid, no appreciable amount of naphthalene appeared up to and including fraction No. 6. In each case, therefore, the column held back the naphthalene from the start, although noticeably better in the case of silica gel impregnated with picric acid than in the case of silica gel alone.

In the eluate from the column of silica gel impregnated with picric acid, naphthalene first began to appear in quantity in fraction No. 7. It increased rapidly in fractions No. 8 and 9. However, the amount of naphthalene in the eluate increased much more rapidly where silica gel alone was used, such increase being particularly noticeable in fractions Nos. 8 and 9. Thus throughout the entire run the column consisting of silica gel impregnated with picric acid was more effective than the column consisting only of silica gel, indicating that the picric acid itself held back the naphthalene, probably by complex formation. The ultimate value for naphthalene in the later fractions was about the same in both cases, being of the order of 5%.

Inasmuch as the test mixture consisted, apart from naphthalene, of 80% iso-octane and 15% mesitylene, the balance in each case was iso-octane and/or mesitylene.

Figure 2:
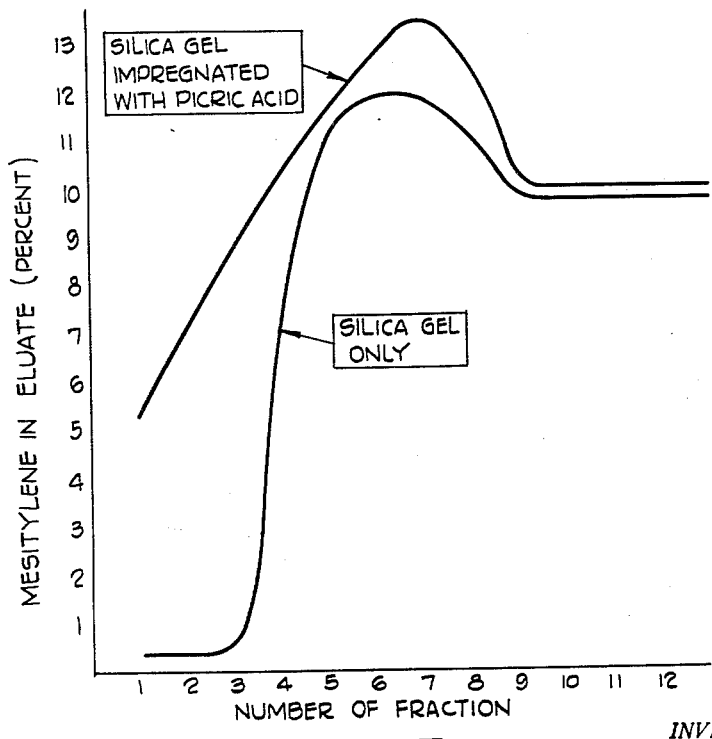

Figure 2 gives the data for mesitylene. It will be noted that in the case of the silica gel column, mesitylene came through in small amount in each of the first three fractions, in very large amounts in fractions Nos. 4, 5, 6 and 7 and in fairly large amounts in subsequent fractions. The column consisting of silica gel impregnated with picric acid gave approximately 5% mesitylene in the first fraction and increasing amounts thereafter up to and including fraction No. 7, with subsequent fractions giving somewhat smaller values. The column consisting of silica gel impregnated with picric acid thus passed the mesitylene from the start, particularly in those fractions in which it was functioning to hold back the naphthalene.

The spread between the two curves establishes that there was a very high degree of separation of the two compounds in the first six or seven fractions.

Similar runs were made using catalytic distillate concentrate in lieu of a mixture of iso-octane, mesitylene and naphthalene. Such concentrates generally contain from 6% to 9% of naphthalene, the higher values being in the heavy end portions. Analysis of the results showed that from the outset the column consisting of picric acid deposited on silica gel held back up to about 35% of the naphthalene. Steam stripping of the solid in the column yielded products with selectivities in the 10% range. These relatively low selectivity values are believed to be due to the fact that the column was still wet with catalytic distillate concentrate at the time the stripping operaion was undertaken.

The data obtained from these runs point to the practicability of clean separation, on a batch basis, particularly if a plurality of columns be used. In such circumstances, the complex can conveniently be treated in situ for the purpose of breaking it down. Where picric acid is used as the complexing agent, this can best be done by steam stripping; i.e., by passing live steam through the column. The effect of the continued introduction of the live steam is first to break down the complex into picric acid and naphthalene, then to drive off the naphthalene and related aromatic compounds, and to leave the picric acid behind in readiness for further use. In the meanwhile, the column should of course be dried, as by blowing warm air through it.

In lieu of picric acid, other complexing agents with an affinity for conjugated polynuclear aromatic compounds such as naphthalene may be employed, including those previously mentioned.

The nature of the stock to be passed through the column may vary widely. As already indicated, it may consist of catalytic distillate concentrate (heavy ends). It may also consist of any of the following:

Catalytic distillate—(0.62, 0.26 and 0.92)
Light catalytic gas oil—(0.10, 1.11 and 1.75)
Thermal reformate (secondary tower bottoms)—(0.49, 1.70 and 2.11)
Coker gas oil—(0.24, 0.28 and 0.31)
Heavy distillate—(0.46, 0.09 and 0.39)

The values in parenthesis are, respectively, those for ordinary naphthalene, methyl naphthalene (alpha), and methyl naphthalene (beta).

It will be apparent that the above examples are merely illustrative of ways in which the invention may be practiced. The form which the apparatus takes is not important, it being sufficient for present purposes to notice that the adsorbent material may take the form of a flat bed or a column, the mass being held in place on some suitable supporting structure. Wide variations in the details of the operations are possible within the skill of those versed in the art to which the invention relates.

It is intended that the patent shall cover, by summarization in appended claim, all features of patentable novelty residing in the invention.

What is claimed is:

A process for separating naphthalene from a hydrocarbon stream containing the same in minor amounts, comprising the step of bringing said stream into contact with a porous bed of granular silica gel uniformly impregnated with picric acid in finely divided form to form complexes between the picric acid and the naphthalene present in said stream.

(References on following page)

References Cited in the file of this patent

UNITED STATES PATENTS 2,716,113 Axe _____ Aug. 23, 1955
2,882,326 Jezl _____ Apr. 14, 1959

OTHER REFERENCES

Chemical Abstracts, vol. 30, page 7009[3] (1936).
J. Am. Chem. Soc., vol. 72, pages 1991–5 (1950).
Chemical Abstracts, vol. 45 (1951), column 1838b.